(12) United States Patent
Shi et al.

(10) Patent No.: US 11,226,917 B2
(45) Date of Patent: Jan. 18, 2022

(54) TRANSLATION-BASED SIGNAL GENERATION METHOD AND DEVICE, HOME BUS SYSTEM (HBS) CIRCUIT, AND USER EQUIPMENT

(71) Applicant: QINGDAO HISENSE HITACHI AIR-CONDITIONING SYSTEMS CO., LTD., Shandong (CN)

(72) Inventors: Jingfeng Shi, Qingdao (CN); Minglong Du, Qingdao (CN); Lei Hou, Qingdao (CN); Leilei Ge, Qingdao (CN)

(73) Assignee: QINGDAO HISENSE HITACHI AIR-CONDITIONING SYSTEMS CO., LTD., Shandong (CN)

( * ) Notice: Subject to any disclaimer, the term of this patent is extended or adjusted under 35 U.S.C. 154(b) by 0 days.

(21) Appl. No.: 16/755,493

(22) PCT Filed: Oct. 11, 2018

(86) PCT No.: PCT/CN2018/109919
§ 371 (c)(1),
(2) Date: Apr. 10, 2020

(87) PCT Pub. No.: WO2019/072218
PCT Pub. Date: Apr. 18, 2019

(65) Prior Publication Data
US 2021/0191891 A1 Jun. 24, 2021

(30) Foreign Application Priority Data
Oct. 11, 2017 (CN) .......................... 201710942121.1

(51) Int. Cl.
*G06F 13/36* (2006.01)
*G06F 13/42* (2006.01)
*H04L 12/40* (2006.01)

(52) U.S. Cl.
CPC .......... *G06F 13/36* (2013.01); *G06F 13/4282* (2013.01); *H04L 12/40* (2013.01); *H04L 2012/40208* (2013.01)

(58) Field of Classification Search
CPC ..... G06F 13/36; G06F 13/4282; H04L 12/40; H04L 2012/40208
See application file for complete search history.

(56) References Cited

U.S. PATENT DOCUMENTS

| | | | | |
|---|---|---|---|---|
| 4,896,349 A | * | 1/1990 | Kubo | ................... H04L 12/2803 379/106.03 |
| 5,237,305 A | * | 8/1993 | Ishikuro | .............. H04L 12/2827 340/286.01 |

(Continued)

FOREIGN PATENT DOCUMENTS

| | | |
|---|---|---|
| CN | 201867801 U | 6/2011 |
| CN | 102447600 A | 5/2012 |

(Continued)

OTHER PUBLICATIONS

R. Hamabe, M. Murata and T. Namekawa, "Home Bus System (HBS) Interface LSI and ITS Standard Protocol Example," in IEEE Transactions on Consumer Electronics, vol. CE-32, No. 1, pp. 9-19, Feb. 1986. (Year: 1986).*

(Continued)

*Primary Examiner* — Glenn A. Auve
(74) *Attorney, Agent, or Firm* — Harness, Dickey & Pierce, P.L.C.

(57) ABSTRACT

Disclosed is a home bus system (HBS) circuit, applicable to home bus (HB) communication implemented using a Microchip chip. The circuit includes the Microchip chip, an HBS communication chip, a resistor, a capacitor, and a transistor, the Microchip chip includes a universal asynchronous receiver/transmitter (UART) input pin and a serial peripheral interface (SPI) output pin, and the HBS communication chip (Continued)

includes an input pin. The transistor has a base coupled to the SPI output pin and a first end of the capacitor, a collector coupled to a first end of the resistor and the input pin of the HBS communication chip, and an emitter grounded, wherein a second end of the resistor is coupled to a power supply, and a second end of the capacitor is grounded.

18 Claims, 6 Drawing Sheets

(56) References Cited

U.S. PATENT DOCUMENTS

| | | | | |
|---|---|---|---|---|
| 5,287,547 | A | * | 2/1994 | Hidaka ............... H04H 20/38 340/4.41 |
| 2008/0147926 | A1 | | 6/2008 | Chen |
| 2013/0064321 | A1 | | 3/2013 | Kopp |

FOREIGN PATENT DOCUMENTS

| | | |
|---|---|---|
| CN | 202433895 U | 9/2012 |
| CN | 106569416 A | 4/2017 |
| CN | 107770021 A | 3/2018 |
| JP | 2004020163 A | 1/2004 |

OTHER PUBLICATIONS

K. Sugihara, S. Kobatake, H. Shirai, H. Oowada and K. Yoshitomi, "HBS-standard-compatible home bus protocol controller," in IEEE Transactions on Consumer Electronics, vol. 35, No. 3, pp. 605-607, Aug. 1989. (Year: 1989).*
Extended European Search Report regarding Application No. 18865821.5 dated Nov. 13, 2020.
Anonymous et al., "Application Note on SPI Communication using UART," Nov. 12, 2010, pp. 1-7.
First Chinese Office Action (with English translation) issued in Application No. CN201710942121.1, dated Jun. 20, 2019.
Huixiang, He, "Application of HBS in multi-connected central air conditioning", Wireless Internet Technology, No. 20, Nantong Shipping College, Nantong, China, Oct. 2016, pp. 132-134 (with abstract).
Shandong University Master's Thesis, "Design and Implementation of Commercial Split Air-conditioning Control System", Mar. 15, 2010 (with Abstract).
Shandong University Master's Thesis, "The Research on HBS Fieldbus Technology of Multi-Air Conditioner", Mar. 25, 2010 (with abstract).
Jin, Guohua, "Application of Communication Chip MM1192 in Multi-units Air Conditioners Control System", Journal of Chongquing Institute of Technology (Natural Science), Zhuhai Gree Electric Appliances Inc., Zhuhai, China, Apr. 2009 (with Abstract).
International Search Report (in English and Chinese) and Written Opinion of the International Searching Authority (in Chinese) issued in PT/CN2018/109919, dated Dec. 29, 2018; ISA/CN.

* cited by examiner

ND DEVICE,
TRANSLATION-BASED SIGNAL GENERATION METHOD AND DEVICE, HOME BUS SYSTEM (HBS) CIRCUIT, AND USER EQUIPMENT

This application is the U.S. National Phase Application under 35 U.S.C. 371 of International Application No. PCT/CN2018/109919 filed on Oct. 11, 2018 which claims priority to Chinese Patent Application No. 201710942121.1, filed with the China National Intellectual Property Administration on Oct. 11, 2017 and entitled "HOME BUS SYSTEM (HBS) CIRCUIT AND TRANSLATION-BASED SIGNAL GENERATION METHOD AND DEVICE". The entire disclosures of all of the above applications are incorporated herein by reference in their entirety.

TECHNICAL FIELD

This disclosure relates to a communications field, and in particular, to a translation-based signal generation method and device, a home bus system (Home Bus System, HBS) circuit, and a user equipment.

BACKGROUND

Multi-split products usually use a home bus (Home Bus, HB) for communication. Such a communication manner is stable and reliable, and polarity does not need to be considered for wiring.

Due to a lack of a synchronization clock required for HomeBus communication, other types of chips do not support HomeBus communication.

SUMMARY

According to a first aspect, an embodiment of this disclosure provides a Home Bus System (HBS) circuit, applicable to home bus HB communication implemented through a Microchip chip. The circuit comprises the Microchip chip having a Universal Asynchronous Receiver/Transmitter (UART) input pin and a Serial Peripheral Interface (SPI) output pin, an HBS communication chip having an input pin, a resistor, a capacitor, and a transistor. The transistor has a base coupled to the SPI output pin and a first end of the capacitor, a collector coupled to a first end of the resistor and the input pin of the HBS communication chip, and an emitter grounded, wherein a second end of the resistor is coupled to a power supply, and a second end of the capacitor is grounded.

According to a second aspect, an embodiment of this disclosure provides a translation-based signal generation device, including: a control chip, configured to generate a synchronous simulation signal based on translation from a communication signal of intention transmission, wherein the synchronous simulation signal is in compliance with a home bus system HBS protocol; and an HBS communicator, configured to convert the synchronous simulation signal into a differential simulation signal for HBS communication.

According to a third aspect, an embodiment of this disclosure further provides a home bus system (HBS) circuit, including the foregoing translation-based signal generation device.

According to a fourth aspect, an embodiment of this disclosure further provides a user equipment, including the translation-based signal generation device according to the second aspect, or including the HBS circuit according to the first aspect.

According to a fifth aspect, an embodiment of this disclosure provides a translation-based signal generation method, including: acquiring a communication signal of intention transmission; generating a synchronous simulation signal in compliance with a home bus system HBS protocol based on translation from the communication signal; and converting the synchronous simulation signal into a differential simulation signal.

According to a sixth aspect, an embodiment of this disclosure provides a controller, including: a memory, configured to store a computer program; and a processor, configured to execute the computer program, to implement the method according to the fifth aspect.

According to a seventh aspect, an embodiment of this disclosure provides a computer storage medium. The computer storage medium is configured to store a computer program, and the computer program is executed to implement the method according to the fifth aspect.

According to an eight aspect, an embodiment of this disclosure provides a computer program product. The computer program product includes an instruction, and the instruction is executed on a computer to implement the method according to the fifth aspect.

BRIEF DESCRIPTION OF DRAWINGS

To describe the technical solutions in the embodiments of this disclosure to be more clear, the accompanying drawings required for describing the embodiments or the prior art are described briefly below. Apparently, the accompanying drawings according to the following description illustrate merely some of embodiments in accordance with this disclosure, and persons of ordinary skill in the art may still derive other drawings from these accompanying drawings without creative efforts.

DESCRIPTION OF EMBODIMENTS

This disclosure provides a translation-based signal generation method and device, a home bus system (HBS) circuit, and a user equipment, to implement home bus HomeBus communication by using a chip without a synchronization clock signal, such as a Microchip chip.

The embodiments of this disclosure are described below with reference to the accompanying drawings.

Figure 1:
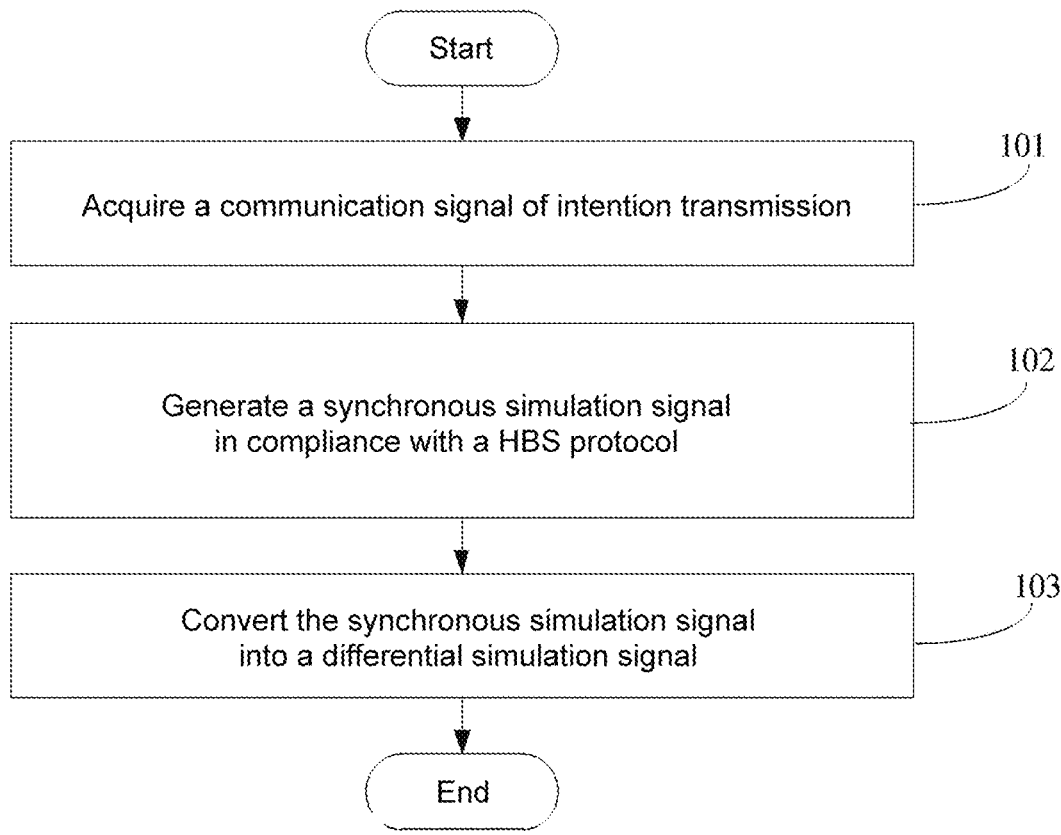
FIG. 1 is a schematic flowchart of a translation-based signal generation method in accordance with an embodiment of this disclosure.

As shown in FIG. 1, a translation-based signal generation method is provided in accordance with some embodiments of this disclosure, including steps:

101. Acquire a communication signal of intention transmission, where the communication signal of intention transmission is not modulated by a synchronization clock.

102. Generate a synchronous simulation signal in compliance with a home bus system HBS protocol based on translation from the communication signal.

103. Convert the synchronous simulation signal into a differential simulation signal.

The communication signal of intention transmission in step 101 may be, such as a signal, with an intention for output and communication, for a chip without a synchronization clock signal, such as a Microchip chip. For example, the communication signal of intention transmission in step 101 may be a UART (Universal Asynchronous Receiver/Transmitter) signal in compliance with a UART communication protocol. The communication signal may be generated internally by a chip, or may be received from outside. In step 102, a control chip generates the synchronous simulation signal based on translation from the communication signal. In step 102, the synchronous simulation signal in compliance with the home bus system HBS protocol may be acquired through simulation by a program built in the control chip and based on computation of the built-in program. In step 103, the synchronous simulation signal proceeds to be converted into the differential simulation signal.

In the translation-based signal generation method of this disclosure, HomeBus communication is implemented through software simulation. Compared with a solution of receiving an external synchronization clock signal and implementing HomeBus communication based on the received synchronization clock signal, the method saves I/O resources of the control chip, and leaves out some of external circuits. In the translation-based signal generation method of this disclosure, HomeBus communication can be implemented without a synchronization clock signal.

In some embodiments of this disclosure, the synchronous simulation signal is generated based on translation from the communication signal by looking up a preset modulation translation table. The modulation translation table includes a correspondence between the communication signal and the synchronous simulation signal in compliance with the home bus system HBS protocol. In this embodiment, the synchronous simulation signal may be generated based on translation from the communication signal of intention transmission by looking up the modulation translation table. The synchronous simulation signal is in a signal format in compliance with the home bus system (HBS) protocol, and therefore, and thus an HBS communicator, such as an MM1192 communication chip, can identify the synchronous simulation signal. Such a method of data translation using a translation table may be used to simulate synchronous communication with asynchronous communication, with a faster response speed.

Figure 2:
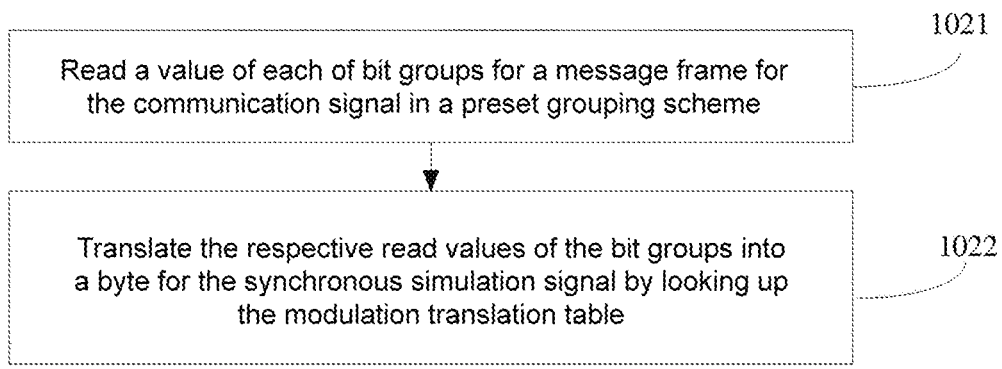
FIG. 2 is a schematic flowchart of a method for generating a synchronous simulation signal according to a communication signal in accordance with an embodiment of this disclosure.

As shown in FIG. 2, in some embodiments of this disclosure, the step of generating a synchronous simulation signal based on translation from the communication signal may include steps:

1021. Read a value of each of bit groups for a message frame for the communication signal by a preset grouping scheme, where a value of one of the bit groups for the message frame includes values of one or more of the bits for the message frame.

1022. Translate the respective read values of the bit groups into bytes for the synchronous simulation signal by looking up the modulation translation table, where the modulation translation table includes a plurality of translation subtables, each of which includes mappings from all possible values of a bit group to a corresponding byte of a synchronous simulation signal.

Hereinafter, for example, the communication signal is a UART signal in compliance with a UART communication protocol, and the synchronous simulation signal is a SPI signal in compliance with a SPI communication protocol. Correspondingly, a modulated signal generated through modulation based on the UART signal and an input clock signal in related technologies may be a modulated UART signal. Certainly, persons skilled in the art would understand that, the communication signal and the synchronous simulation signal may alternatively be in other signal formats, and in view of this disclosure, persons skilled in the art may easily acquire a corresponding method for generating a synchronous simulation signal based on translation from a communication signal.

Figure 3:
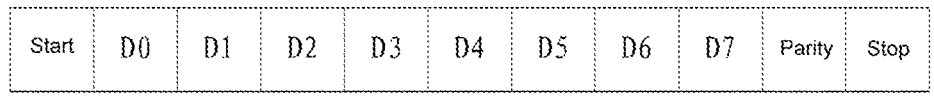
FIG. 3 is a schematic diagram illustrating a frame for a UART signal.

The UART signal is a UART signal that is not modulated by a synchronization clock. A frame for the signal may transmit 11 bits in total. Referring to FIG. 3, the 11 bits include one start bit, eight data bits (D0 to D7) (one byte), one parity bit, and one stop bit.

Figure 4:
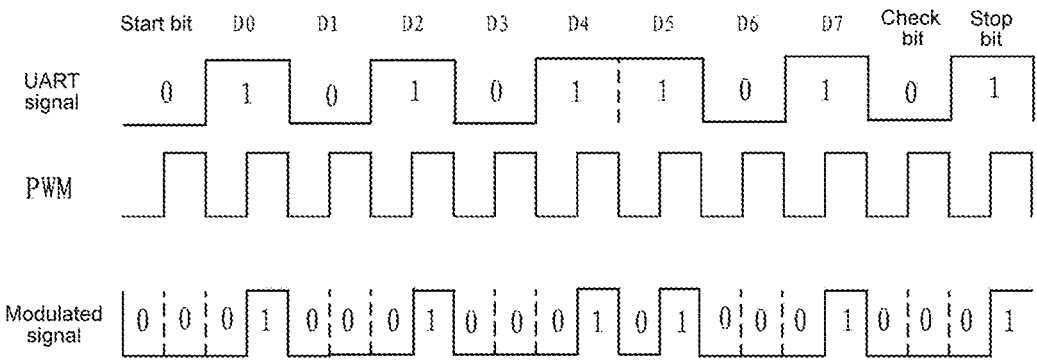
FIG. 4 is a schematic diagram illustrating a UART signal being modulated by using a PWM clock signal in accordance with related technologies.

Referring to FIG. 4, if the UART signal is modulated by a pulse width modulation (Pulse Width Modulation, PWM) clock signal with a double frequency, a frame for the modulated signal includes 22 bits.

In some embodiments, the SPI signal is generated according to the UART signal by using an algorithm without referring to a synchronization clock signal, so that a signal format of the generated SPI signal is the same as a signal format of a modulated UART signal in related technologies that is generated upon modulation of a UART signal by referring to a synchronization clock signal. In other words, the SPI signal is in compliance with the home bus system HBS protocol.

Every four of bytes for the SPI signal may be corresponding to a frame for the UART signal, the SPI signal has a Baud rate twice the UART signal, and the SPI signal simulates the modulated UART signal.

The SPI signal acquired upon translation is used to simulate the modulated UART signal, and the Baud rate of the SPI signal needs to be twice the Baud rate of the UART signal. For example, assuming that the Baud rate of the UART signal is 9600 bps, the Baud rate of the output SPI signal needs to be 19200 bps.

Each of SPI data packets of the SPI signal may include 8, 16, or 32 bits. It is assumed that eight bits are taken as a SPI data packet. In order to simulate 22 bits of a frame for the modulated UART signal, at least three SPI data packets are needed. Corresponding translations between bytes for the SPI signal and bits of a frame for the UART signal may be implemented by looking up a table, which can reach a higher translation efficiency. Alternatively, the corresponding translations between bytes for the SPI signal and bits of a frame for the UART signal may be implemented using any other methods known to persons skilled in the art, such as software programming.

Figure 5:
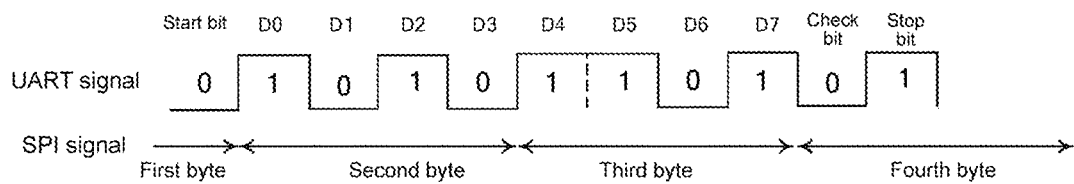
FIG. 5 is a schematic diagram illustrating a grouping scheme used for data translation in accordance with some embodiments of this disclosure.

Scheme 1:

In some embodiments, a SPI data packet of four bytes may be transmitted to simulate valid data of a frame for the UART signal. For example, as shown in FIG. 5, in a SPI data packet, the first byte for the SPI signal is corresponding to a start bit of a frame for data of the UART signal; the second byte and the third byte for the SPI signal are corresponding to bits of the data of the UART signal, for example, the second byte for the SPI signal is corresponding to a bit 0 (D0) to a bit 3 (D3) of data bits (D0 to D7) in the frame for the data of the UART signal, and the third byte for the SPI signal is corresponding to a bit 4 (D4) to a bit 7 (D7) of data bits in the frame for the data of the UART signal; and the fourth byte for the SPI signal is corresponding to a parity bit and a stop bit for the UART signal. In other words, the start bit for the UART signal is a first bit group, corresponding to the first byte for the SPI signal; the bit 0 to the bit 3 (D0 to D3) of the data bits (D0 to D7) for the UART signal is a second bit group, corresponding to the second byte for the SPI signal; the bit 4 to the bit 7 (D4 to D7) of the data bits (D0 to D7) for the UART signal are a third bit group, corresponding to the third byte for the SPI signal; and the parity bit and the stop bit in the frame for the data of the UART signal is a fourth bit group, corresponding to the fourth byte for the SPI signal. The respective values of the bit groups for a message frame for the UART signal are read by this grouping scheme, and the corresponding SPI signal is acquired by looking up the modulation translation table.

Five arrays as below are translation subtables of the modulation translation table, and used to quickly search for a SPI data packet of four bytes upon translation by the respective values of bit groups in the message frame for the UART signal. For example, assuming that the UART signal represents "0x00", with a Baud rate 9600 bps, a SPI data packet of four bytes for the SPI signal acquired upon translation includes: "0x01"+"0x55"+"0x55"+"0x40", with a Baud rate 19200 bps.

The first bit group, namely, the start bit for the original data, is corresponding to the first byte of the SPI data packet. Because all data are corresponding to the same start bit, all data elements in an array table0[256] corresponding to the first byte are 0x01.

In software programming, a translation subtable corresponding to the first bit group, namely, the array table0[256] is presented as follows:

```
const unsigned char TXnum_table0[256] = { // First Byte
0x01,0x01,0x01,0x01,0x01,0x01,0x01,0x01,0x01,0x01,//0~9
0x01,0x01,0x01,0x01,0x01,0x01,0x01,0x01,0x01,0x01,//10~19
0x01,0x01,0x01,0x01,0x01,0x01,0x01,0x01,0x01,0x01,//20~29
0x01,0x01,0x01,0x01,0x01,0x01,0x01,0x01,0x01,0x01,//30~39
0x01,0x01,0x01,0x01,0x01,0x01,0x01,0x01,0x01,0x01,//40~49
0x01,0x01,0x01,0x01,0x01,0x01,0x01,0x01,0x01,0x01,//50~59
0x01,0x01,0x01,0x01,0x01,0x01,0x01,0x01,0x01,0x01,//60~69
0x01,0x01,0x01,0x01,0x01,0x01,0x01,0x01,0x01,0x01,//70~79
0x01,0x01,0x01,0x01,0x01,0x01,0x01,0x01,0x01,0x01,//80~89
0x01,0x01,0x01,0x01,0x01,0x01,0x01,0x01,0x01,0x01,//90~99
0x01,0x01,0x01,0x01,0x01,0x01,0x01,0x01,0x01,0x01,//100~109
0x01,0x01,0x01,0x01,0x01,0x01,0x01,0x01,0x01,0x01,//110~119
0x01,0x01,0x01,0x01,0x01,0x01,0x01,0x01,0x01,0x01,//120~129
0x01,0x01,0x01,0x01,0x01,0x01,0x01,0x01,0x01,0x01,//130~139
0x01,0x01,0x01,0x01,0x01,0x01,0x01,0x01,0x01,0x01,//140~149
0x01,0x01,0x01,0x01,0x01,0x01,0x01,0x01,0x01,0x01,//150~149
0x01,0x01,0x01,0x01,0x01,0x01,0x01,0x01,0x01,0x01,//160~169
0x01,0x01,0x01,0x01,0x01,0x01,0x01,0x01,0x01,0x01,//170~179
0x01,0x01,0x01,0x01,0x01,0x01,0x01,0x01,0x01,0x01,//180~189
0x01,0x01,0x01,0x01,0x01,0x01,0x01,0x01,0x01,0x01,//190~199
0x01,0x01,0x01,0x01,0x01,0x01,0x01,0x01,0x01,0x01,//200~209
0x01,0x01,0x01,0x01,0x01,0x01,0x01,0x01,0x01,0x01,//210~219
0x01,0x01,0x01,0x01,0x01,0x01,0x01,0x01,0x01,0x01,//220~229
0x01,0x01,0x01,0x01,0x01,0x01,0x01,0x01,0x01,0x01,//230~239
0x01,0x01,0x01,0x01,0x01,0x01,0x01,0x01,0x01,0x01,//240~249
0x01,0x01,0x01,0x01,0x01,0x01            //250~255
}.
```

That is, the start bit for the UART signal is 0, and therefore, values of the array among all arrays for the data corresponding to the first bit group may be directly defined as 0x01.

The second bit group, namely, the bit 0 to the bit 3 D0, D1, D2 and D3 of the original data, is corresponding to the second byte of SPI data. UART data and SPI data are transmitted in reverse data sequences. Therefore, the original binary data needs to be reversed left to right during data translation. In addition, if a PIC32MX350F256L chip is used for data translation and a SOP MM1192 communication chip (an HBS communication chip) produced by MITSUMI is used to generate differential simulation signals from the synchronous simulation signal, a triode is further needed to perform a level inversion prior to input to the MM1192, considering that SPI output of the PIC32MX series chip is at a low level in an idle state while an idle signal as input of the MM1192 needs to be at a high level. Meanwhile, data inversion needs to be performed on the original binary data for data translation. To be specific, data bit "0" is inverted to "1", and data bit "1" is inverted to "0". In some embodiments, a SPI signal outputting chip and a backend SPI signal receiving chip have a same level in an idle state, and therefore, level inversion may not be performed. The data translation for the group may be implemented through Turbo C software programming, or implemented by looking up a translation subtable compiled in advance. A translation subtable corresponding to the second bit group, namely, an array table1[256] is presented as follows:

```
const unsigned char TXnum_table1[256]={ //Second Byte
0x55,0x15,0x45,0x5,0x51,0x11,0x41,0x1,0x54,0x14,//0~9
0x44,0x4,0x50,0x10,0x40,0x0,0x55,0x15,0x45,0x5,  //10~19
0x51,0x11,0x41,0x1,0x54,0x14,0x44,0x4,0x50,0x10, //20~29
0x40,0x0,0x55,0x15,0x45,0x5,0x51,0x11,0x41,0x1,  //30~39
0x54,0x14,0x44,0x4,0x50,0x10,0x40,0x0,0x55,0x15, //40~49
0x45,0x5,0x51,0x11,0x41,0x1,0x54,0x14,0x44,0x4,  //50~59
0x50,0x10,0x40,0x0,0x55,0x15,0x45,0x5,0x51,0x11, //60~69
0x41,0x1,0x54,0x14,0x44,0x4,0x50,0x10,0x40,0x0,  //70~79
0x55,0x15,0x45,0x5,0x51,0x11,0x41,0x1,0x54,0x14, //80~89
0x44,0x4,0x50,0x10,0x40,0x0,0x55,0x15,0x45,0x5,  //90~99
0x51,0x11,0x41,0x1,0x54,0x14,0x44,0x4,0x50,0x10, //100~109
```

-continued

```
0x40,0x0,0x55,0x15,0x45,0x5,0x51,0x11,0x41,0x1,   //110~119
0x54,0x14,0x44,0x4,0x50,0x10,0x40,0x0,0x55,0x15,  //120~129
0x45,0x5,0x51,0x11,0x41,0x1,0x54,0x14,0x44,0x4,   //130~139
0x50,0x10,0x40,0x0,0x55,0x15,0x45,0x5,0x51,0x11,  //140~149
0x41,0x1,0x54,0x14,0x44,0x4,0x50,0x10,0x40,0x0,   //150~159
0x55,0x15,0x45,0x5,0x51,0x11,0x41,0x1,0x54,0x14,  //160~169
0x44,0x4,0x50,0x10,0x40,0x0,0x55,0x15,0x45,0x5,   //170~179
0x51,0x11,0x41,0x1,0x54,0x14,0x44,0x4,0x50,0x10,  //180~189
0x40,0x0,0x55,0x15,0x45,0x5,0x51,0x11,0x41,0x1,   //190~199
0x54,0x14,0x44,0x4,0x50,0x10,0x40,0x0,0x55,0x15,  //200~209
0x45,0x5,0x51,0x11,0x41,0x1,0x54,0x14,0x44,0x4,   //210~219
0x50,0x10,0x40,0x0,0x55,0x15,0x45,0x5,0x51,0x11,  //220~229
0x41,0x1,0x54,0x14,0x44,0x4,0x50,0x10,0x40,0x0,   //230~239
0x55,0x15,0x45,0x5,0x51,0x11,0x41,0x1,0x54,0x14,  //240~249
0x44,0x4,0x50,0x10,0x40,0x00           //250~255}.
```

The third bit group, namely, the bit 4 to the bit 7 D4, D5, D6, and D7 of the data bits for the original data, is corresponding to the third byte of SPI data. An array table2[256] is used to store translation data for the third bit group. Translation for the group is similar to Table1 [256]. A translation subtable corresponding to the third bit group, namely, the array table2[256] is presented as follows:

```
const unsigned char TXnum_table2[256]={ //Third Byte
0x55,0x55,0x55,0x55,0x55,0x55,0x55,0x55,0x55,0x55,//0~9
0x55,0x55,0x55,0x55,0x55,0x55,0x55,0x15,0x15,0x15,//10~19
0x15,0x15,0x15,0x15,0x15,0x15,0x15,0x15,0x15,0x15,//20~29
0x15,0x15,0x45,0x45,0x45,0x45,0x45,0x45,0x45,0x45,//30~39
0x45,0x45,0x45,0x45,0x45,0x45,0x45,0x45,0x5,0x5,  //40~49
0x5,0x5,0x5,0x5,0x5,0x5,0x5,0x5,0x5,0x5,//50~59
0x5,0x5,0x5,0x5,0x51,0x51,0x51,0x51,0x51,0x51,//60~69
0x51,0x51,0x51,0x51,0x51,0x51,0x51,0x51,0x51,0x51,//70~79
0x11,0x11,0x11,0x11,0x11,0x11,0x11,0x11,0x11,0x11,//80~89
0x11,0x11,0x11,0x11,0x11,0x11,0x41,0x41,0x41,0x41,//90~99
0x41,0x41,0x41,0x41,0x41,0x41,0x41,0x41,0x41,0x41,//100~109
0x41,0x41,0x1,0x1,0x1,0x1,0x1,0x1,0x1,0x1,//110~119
0x1,0x1,0x1,0x1,0x1,0x1,0x1,0x1,0x54,0x54,//120~129
0x54,0x54,0x54,0x54,0x54,0x54,0x54,0x54,0x54,0x54,//130~139
0x54,0x54,0x54,0x54,0x14,0x14,0x14,0x14,0x14,0x14,//140~149
0x14,0x14,0x14,0x14,0x14,0x14,0x14,0x14,0x14,0x14,//150~159
0x44,0x44,0x44,0x44,0x44,0x44,0x44,0x44,0x44,0x44,//160~169
0x44,0x44,0x44,0x44,0x44,0x44,0x4,0x4,0x4,0x4,//170~179
0x4,0x4,0x4,0x4,0x4,0x4,0x4,0x4,0x4,0x4,//180~189
0x4,0x4,0x50,0x50,0x50,0x50,0x50,0x50,0x50,0x50,//190~199
0x50,0x50,0x50,0x50,0x50,0x50,0x50,0x50,0x10,0x10,//200~209
0x10,0x10,0x10,0x10,0x10,0x10,0x10,0x10,0x10,0x10,//210~219
0x10,0x10,0x10,0x10,0x40,0x40,0x40,0x40,0x40,0x40,//220~229
0x40,0x40,0x40,0x40,0x40,0x40,0x40,0x40,0x40,0x40,//230~239
0x0,0x0,0x0,0x0,0x0,0x0,0x0,0x0,0x0,0x0,//240~249
0x0,0x0,0x0,0x0,0x0,0x0         //250~255}.
```

The fourth bit group, namely, the parity bit and the stop bit for the original data, are corresponding to the fourth byte of SPI data. If an odd parity check is used for parity check, a translation subtable corresponding to the fourth bit group, namely, an array table3_1[256] is presented as follows:

```
const unsigned char TXnum_table3_1[256]=
{//Odd Parity Check List for Fourth Byte
0x0,0x40,0x40,0x0,0x40,0x0,0x0,0x40,0x40,0x0,//0~9
0x0,0x40,0x0,0x40,0x40,0x0,0x40,0x0,0x0,0x40,//10~19
0x0,0x40,0x40,0x0,0x0,0x40,0x40,0x0,0x40,0x0,//20~29
0x40,0x0,0x0,0x40,0x0,0x40,0x40,0x0,0x0,0x40,//30~39
0x0,0x40,0x40,0x0,0x40,0x0,0x0,0x40,0x0,0x40,//40~49
0x40,0x0,0x0,0x40,0x40,0x0,0x0,0x40,0x0,0x40,//50~59
0x40,0x0,0x40,0x0,0x0,0x40,0x0,0x40,0x40,0x0,//60~69
0x40,0x0,0x0,0x40,0x0,0x40,0x40,0x0,0x0,0x40,//70~79
0x0,0x40,0x0,0x40,0x40,0x0,0x40,0x0,0x0,0x40,//80~89
0x0,0x40,0x40,0x0,0x40,0x0,0x0,0x40,0x40,0x0,//90~99
0x40,0x0,0x0,0x40,0x0,0x40,0x40,0x0,0x0,0x40,//100~109
0x40,0x0,0x40,0x0,0x0,0x40,0x0,0x40,0x40,0x0,//110~119
0x0,0x40,0x40,0x0,0x0,0x40,0x0,0x40,0x40,0x0,//120~129
0x0,0x40,0x0,0x40,0x40,0x0,0x0,0x40,0x40,0x0,//130~139
0x40,0x0,0x0,0x40,0x0,0x40,0x40,0x0,0x40,0x0,//140~149
0x0,0x40,0x40,0x0,0x0,0x40,0x0,0x40,0x40,0x0,//150~159
0x0,0x40,0x40,0x0,0x40,0x0,0x0,0x40,0x40,0x0,//160~169
0x0,0x40,0x0,0x40,0x40,0x0,0x40,0x0,0x0,0x40,//170~179
0x0,0x40,0x40,0x0,0x0,0x40,0x40,0x0,0x40,0x0,//180~189
0x40,0x0,0x0,0x40,0x0,0x40,0x40,0x0,0x0,0x40,//190~199
0x40,0x0,0x0,0x40,0x40,0x0,0x40,0x0,0x0,0x40,//200~209
0x0,0x40,0x0,0x40,0x40,0x0,0x0,0x40,0x40,0x0,//210~219
0x40,0x0,0x40,0x0,0x0,0x40,0x0,0x40,0x40,0x0,//220~229
0x40,0x0,0x0,0x40,0x0,0x40,0x40,0x0,0x0,0x40,//230~239
0x0,0x40,0x40,0x0,0x40,0x0,0x0,0x40,0x40,0x0,//240~249
0x0,0x40,0x0,0x40,0x40,0x00      //250-255}.
```

If an even parity check is used for parity check, a translation subtable corresponding to the fourth bit group, namely, an array table3_2[256] is presented as follows:

```
const unsigned char TXnum_table3_2[256]=
{ //Even Parity Check List for Fourth Byte
0x40,0x0,0x0,0x40,0x0,0x40,0x40,0x0,0x0,0x40,//0~9
0x40,0x0,0x40,0x0,0x0,0x40,0x0,0x40,0x40,0x0,//10~19
0x0,0x40,0x40,0x0,0x40,0x0,0x0,0x40,0x40,0x0,//20~29
0x40,0x0,0x0,0x40,0x40,0x0,0x0,0x40,0x0,0x40,//30~39
0x0,0x40,0x0,0x40,0x40,0x0,0x40,0x0,0x0,0x40,//40~49
0x0,0x40,0x40,0x0,0x0,0x40,0x0,0x40,0x40,0x0,//50~59
0x40,0x0,0x0,0x40,0x0,0x40,0x40,0x0,0x40,0x0,//60~69
0x0,0x40,0x40,0x0,0x0,0x40,0x0,0x40,0x40,0x0,//70~79
0x40,0x0,0x0,0x40,0x0,0x40,0x40,0x0,0x0,0x40,//80~89
0x0,0x40,0x0,0x40,0x40,0x0,0x40,0x0,0x0,0x40,//90~99
0x0,0x40,0x40,0x0,0x0,0x40,0x40,0x0,0x0,0x40,0x0,//100~109
0x0,0x40,0x0,0x40,0x40,0x0,0x0,0x40,0x0,0x40,//110~119
0x40,0x0,0x0,0x40,0x0,0x40,0x40,0x0,0x0,0x40,//120~129
0x0,0x40,0x40,0x0,0x40,0x0,0x0,0x40,0x0,0x40,//130~139
0x0,0x40,0x0,0x40,0x40,0x0,0x40,0x0,0x0,0x40,//140~149
0x40,0x0,0x0,0x40,0x0,0x40,0x40,0x0,0x0,0x40,//150~159
0x40,0x0,0x0,0x40,0x0,0x40,0x40,0x0,0x0,0x40,//160~169
0x0,0x40,0x40,0x0,0x40,0x0,0x0,0x40,0x40,0x0,//170~179
0x40,0x0,0x0,0x40,0x0,0x40,0x40,0x0,0x0,0x40,//180~189
0x40,0x0,0x40,0x0,0x0,0x40,0x0,0x40,0x40,0x0,//190~199
0x0,0x40,0x0,0x40,0x40,0x0,0x0,0x40,0x40,0x0,//200~209
0x40,0x0,0x40,0x0,0x0,0x40,0x0,0x40,0x0,0x40,//210~219
0x0,0x40,0x40,0x0,0x0,0x40,0x40,0x0,0x0,0x40,//220~229
0x0,0x40,0x40,0x0,0x40,0x0,0x0,0x40,0x40,0x0,//230~239
0x40,0x0,0x0,0x40,0x0,0x40,0x0,0x0,0x0,0x40,//240~249
0x40,0x0,0x40,0x0,0x0,0x40      //250-255}.
```

In the original data as above, the eight bits of data bits actually occupy, by themselves, two full bytes. In some embodiments, a SPI signal is generated by translation from the UART signal based on a preset modulation translation table, wherein the SPI signal includes four bytes, where the first six bits in the first byte for the SPI signal are empty, the last four bits in the fourth byte are empty, and 0 may be assigned to the empty bits. The preset modulation translation table stores a preset relationship, where a start bit for the UART signal is translated into the last two bits in the first byte for the SPI signal, the data bits D0 to D3 for the UART signal is translated into the second byte for the SPI signal generated upon data reversion left to right and inversion, the data bits D4 to D7 for the UART signal is translated into the third byte for the SPI signal generated upon data reversion left to right and inversion, and the parity bit and the stop bit for the UART signal is translated into the first four bits in the fourth byte.

In some embodiments, the start bit for the UART signal is translated into the last two bits in the first byte for the SPI signal. To be specific, the first byte data is 0x01.

Figure 6:
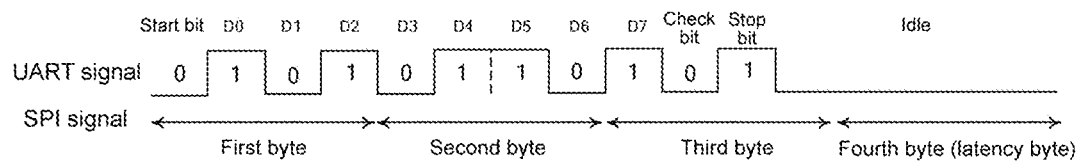
FIG. 6 is a schematic diagram illustrating another grouping scheme used for data translation in accordance with some embodiments of this disclosure.

Scheme 2:

As shown in FIG. 6, in some further embodiments, the first byte for the SPI signal is corresponding to the start bit and the data bits D0 to D2, the second byte for the SPI signal is corresponding to the data bits D3 to D6, and the third byte for the SPI signal is corresponding to the data bit D7, the parity bit, and the stop bit, for a frame for data of the UART signal. In other words, the start bit and the data bits D0 to D2 are the first bit group, corresponding to the first byte for the SPI signal; the data bits D3 to D6 are the second bit group, corresponding to the second byte for the SPI signal; and the data bit D7, the parity bit, and the stop bit are the third bit group, corresponding to the third byte for the SPI signal.

In addition, optionally, in order to ensure data accuracy, a latency of one byte may be added. To be specific, the fourth byte for the SPI signal is used for latency.

Each of values of bit groups for a message frame for the UART signal is read by the above grouping scheme, and a corresponding SPI signal is acquired by, for example, looking up a modulation translation table. Data translation according to Scheme 2 is substantially similar to that according to Scheme 1, except for differences between the modulation translation tables.

In step 102, data format translation is implemented using software, to simulate the signal in compliance with the home bus system HBS protocol. In other words, the synchronous simulation signal acquired in step 102 is in the same signal format as the modulated UART signal in related technologies, and accordingly can support HBS communication.

In step 103, the synchronous simulation signal may be converted into the differential simulation signals by an HBS communication chip supporting HBS communication. For example, the HBS communication chip may be the SOP MM1192 communication chip produced by MITSUMI. For example, in some embodiments, a chip for data translation may be a Microchip chip. The Microchip chip transmits the SPI signal through a SPI output pin, and the SPI signal is used as input to the MM1192 communication chip to acquire the differential simulation signals.

Figure 7:
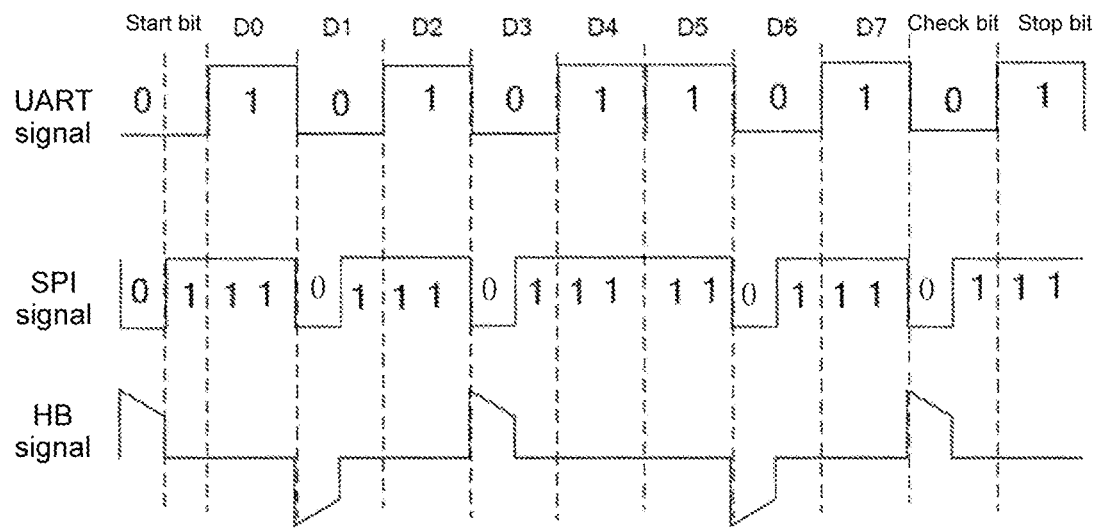
FIG. 7 is a schematic diagram illustrating a waveform correspondence between a UART signal, a SPI signal, and an HB signal in accordance with some embodiments of this disclosure.

In FIG. 7, it is illustrated that a SPI signal is acquired through translation from a UART signal, and finally a differential simulation HB signal is generated by the HBS communication chip 12.

Figure 8:
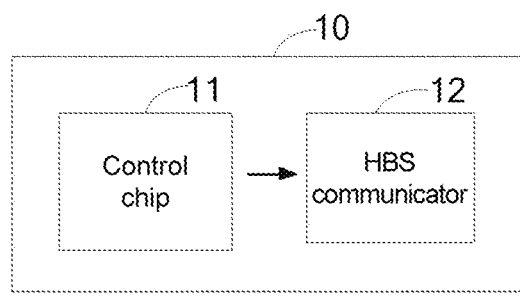
FIG. 8 is a schematic structural diagram illustrating a translation-based signal generation device in accordance with some embodiments of this disclosure.

Some embodiments of this disclosure further provide a translation-based signal generation device. As shown in FIG. 8, the translation-based signal generation device 10 includes a control chip 11 and an HBS communicator 12. The control chip 11 is configured to generate a synchronous simulation signal based on translation from a communication signal. The synchronous simulation signal is in compliance with a home bus system HBS protocol. The HBS communicator 12 is configured to convert the synchronous simulation signal into differential simulation signals. Referring to FIG. 8, the control chip 11 may be, for example, a Microchip chip or a chip or a circuit that implements a similar function, and the HBS communicator 12 may be, for example, an HBS communication chip or a chip or a circuit that implements a similar function. The HBS communication chip may be, for example, an MM1192 communication chip.

Figure 9:
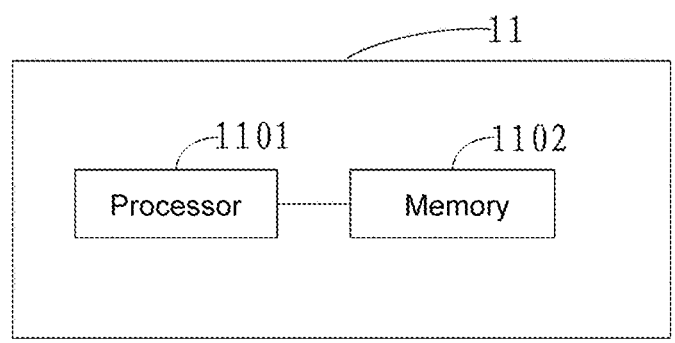
FIG. 9 is a schematic structural diagram illustrating a control chip in accordance with some embodiments of this disclosure.

As shown in FIG. 9, in some embodiments of this disclosure, the control chip 11 includes a processor 1101 and a memory 1102. The processor 1101 is configured to generate the synchronous simulation signal based on translation from the communication signal by looking up a preset modulation translation table. The memory 1102 is configured to store the modulation translation table and data of a communication signal of intention transmission. The modulation translation table includes a correspondence between the synchronous simulation signal in compliance with the home bus system HBS protocol and the communication signal.

Figure 10:
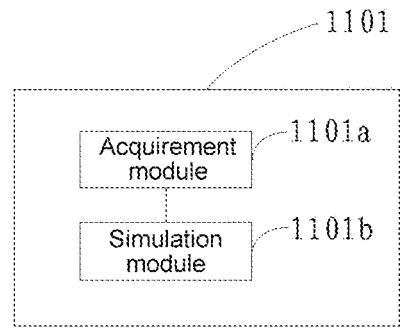
FIG. 10 is a schematic structural diagram illustrating a processor in accordance with some embodiments of this disclosure.

As shown in FIG. 10, in some embodiments of this disclosure, the processor 1101 includes an acquirement module 1101a and a simulation module 1101b. The acquirement module 1101a is configured to read each of values of bit groups for a message frame for the communication signal by a preset grouping scheme. The each of the values of the bit groups for the message frame includes values of one or more bits for the message frame. For example, a frame for a UART signal that is not modulated by a synchronization clock includes 11 bits, and a preset grouping scheme may be offered as follows: A start bit is a first bit group, a bit 0 to a bit 3 in data bits are a second bit group, a bit 4 to a bit 7 in the data bits are a third bit group, and a parity bit and a stop bit are a fourth bit group. The simulation module 1101b is configured to translate each of the read values of the bit groups into a byte for the synchronous simulation signal by looking up the modulation translation table. The modulation translation table includes a plurality of translation subtables, each of which includes mappings from all possible values of a bit group to a corresponding byte for the synchronous simulation signal. For a value of one of the bit groups, corresponding data for the synchronous simulation signal may be acquired based on translation by looking up a corresponding translation subtable, and is usually a byte for the synchronous simulation signal.

Figure 11:
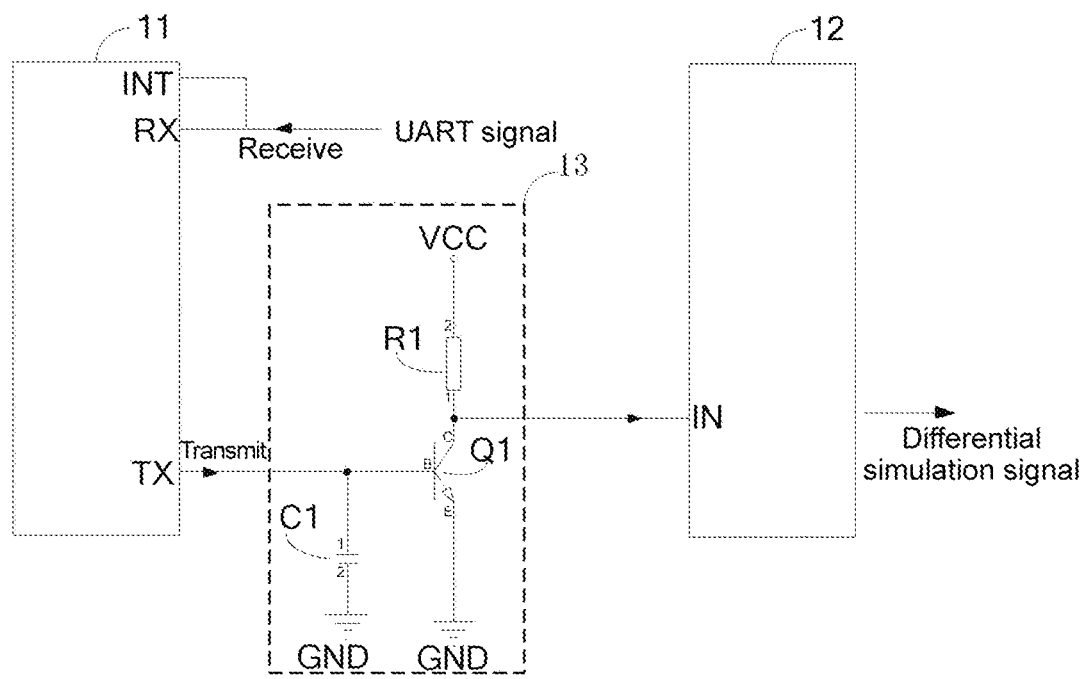
FIG. 11 is a schematic structural diagram illustrating an HBS circuit in accordance with some embodiments of this disclosure.

In some embodiments of this disclosure, referring to FIG. 11, the control chip 11 includes a serial peripheral interface (Serial Peripheral Interface, SPI), and the serial peripheral interface has an output pin TX configured to output the synchronous simulation signal acquired upon data translation; and the HBS communicator 12 is an HBS communication chip, the HBS communication chip 12 includes an input pin IN, and the input pin IN is configured to receive the synchronous simulation signal. The HBS communication chip 12 generates the differential simulation signals for HBS communication based on the synchronous simulation signal.

If the control chip 11 is at a low level in an idle state, while an idle signal as input for the HBS communication chip 12 needs to be at a high level, a level converter 13 needs to be provided for level inversion, to meet a requirement of the input pin IN of the HBS communication chip. As shown in FIG. 11, in some embodiments of this disclosure, the output pin TX of the serial peripheral interface is coupled to the input pin IN of the HBS communication chip through the level converter 13. The level converter 13 is configured to perform level inversion on the synchronous simulation signal that is output from the output pin TX of the serial peripheral interface, to meet the requirement of the input pin IN of the HBS communication chip. In some other embodiments of this disclosure, an idle level of the control chip 11 is the same as an idle level of the HBS communication chip 12, for example, both are a low level or a high level. In this case, the level converter 13 may not be provided between the control chip 11 and the communication chip 12. In addition, one skilled in the art would understand that the level converter 13 may regular a magnitude of an output voltage of the control chip 11 so as to conform to an input voltage of the communication chip 12.

In some embodiments of this disclosure, referring to FIG. 11, the control chip 11 is, for example, a Microchip chip, the HBS communicator 12 is an HBS communication chip, and the level converter 13 includes a transistor Q1, a resistor R1, and a capacitor C1. The Microchip chip 11 includes a universal asynchronous receiver/transmitter (Universal Asynchronous Receiver/Transmitter, UART) input pin RX, a serial peripheral interface (Serial Peripheral Interface, SPI) output pin TX, and an interrupt pin INT. The HBS communication chip 12 includes an input pin IN.

The UART input pin RX and the interrupt pin INT of the Microchip chip 11 are connected, and the UART input pin RX is configured to receive a signal. The SPI output pin TX is configured to output a signal, that is, from a communication signal of intention transmission, a SPI signal is generated for output based on translation in the Microchip chip 11. The SPI signal is in a signal format in compliance with the home bus system HBS protocol. The SPI signal is input to the HBS communication chip 12 through the level converter 13. The HBS communication chip 12 finally outputs the differential simulation signals by collecting a signal on a bus on which the input pin IN is located.

The SPI output pin TX of the Microchip chip 11 is coupled to a base B of the transistor Q1 and a first end of the capacitor C1. A collector C of the transistor Q1 is coupled to a first end of the resistor R1 and the input pin IN of the HBS communication chip 12. An emitter E of the transistor Q1 is grounded, a second end of the resistor R1 is coupled to a positive voltage power supply signal VCC (for example, 5 V), and a second end of the capacitor C1 is grounded.

For example, the Microchip chip 11 may be a PIC32MX chip, and the HBS communication chip 12 may be an MM1192 communication chip. Because a SPI output pin TX of a PIC32MX series chip is at a low level in an idle state, while an idle signal as input for an input pin IN of the MM1192 needs to be at a high level, the transistor Q1 is configured to perform level inversion on the SPI signal prior to input to the MM1192. R1 functions as a pull-up resistor of the transistor Q1, and C1 is a filter capacitor.

Figure 12:
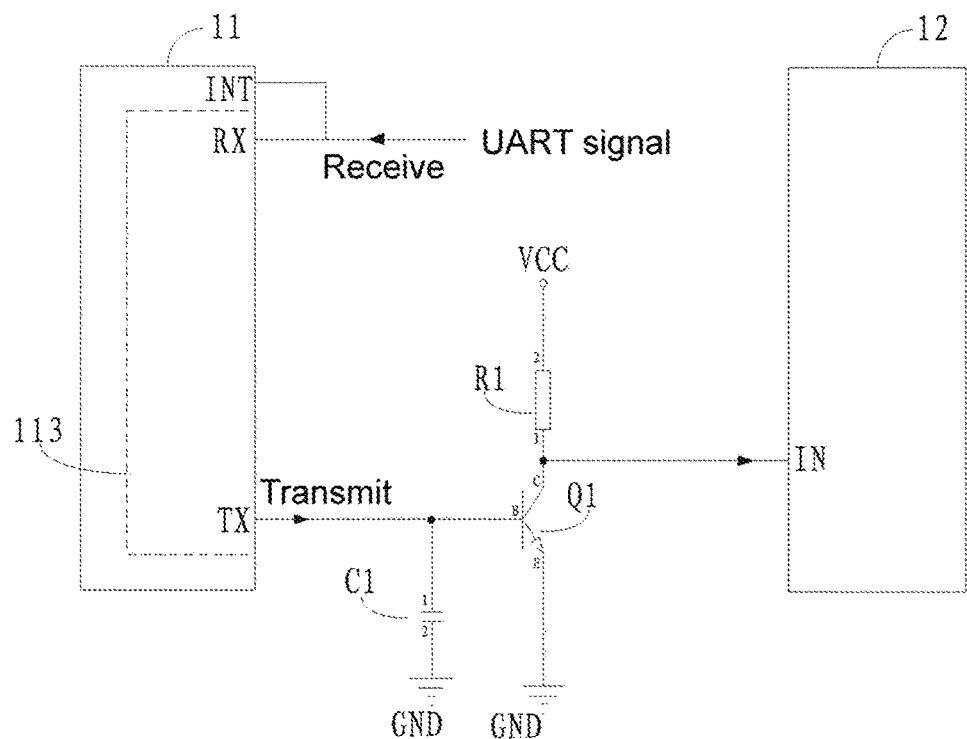
FIG. 12 is a schematic structural diagram illustrating another HBS circuit in accordance with some embodiments of this disclosure.

Referring to FIG. 12, in some embodiments of this disclosure, the control chip 11 communicates through synchronous transmission and asynchronous reception. An input pin RX of a first logical communication port 113 of the control chip 11 is configured to be a UART signal receiving port, and an output pin TX of the first logical communication port 113 of the control chip is configured to be a SPI signal transmitting port. It should be noted for hardware design that, for some chips, a serial clock (Serial Clock, SCK) port matching a SPI bus may be enabled automatically, and in this case, the SCK port cannot be used for other input/output (I/O).

Figure 13:
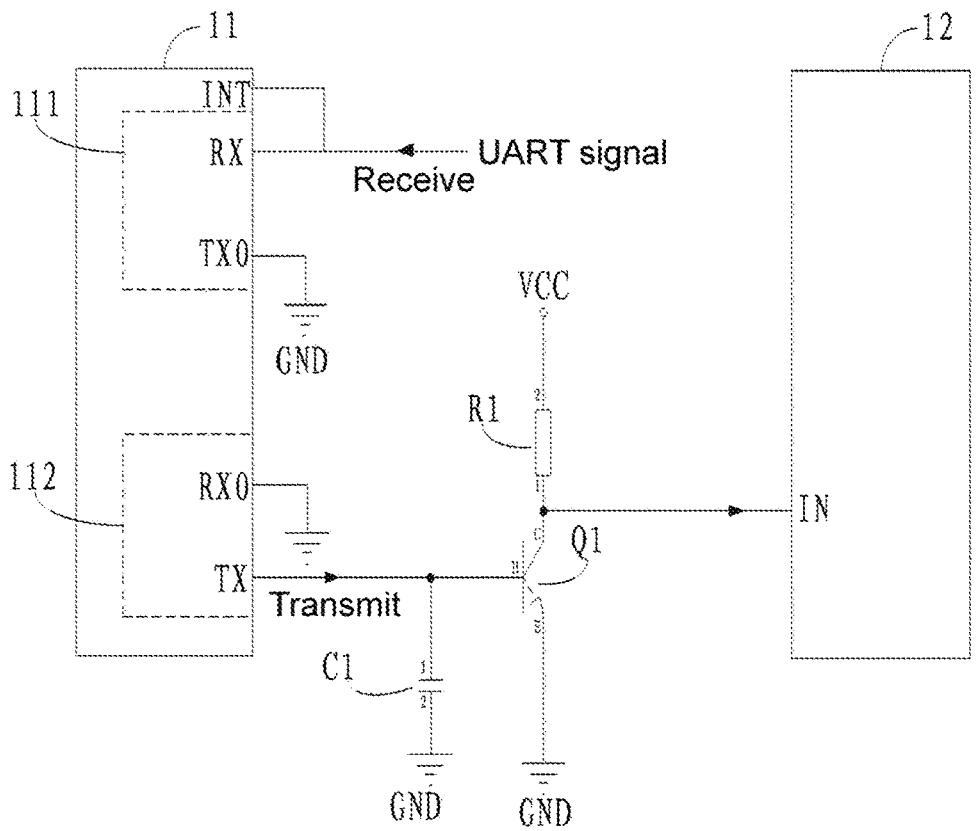
FIG. 13 is a schematic structural diagram illustrating still another HBS circuit in accordance with some embodiments of this disclosure.

In some embodiments of this disclosure, as shown in FIG. 13, an input pin RX of a second logical communication port 111 of the control chip 11 is configured to be a UART signal receiving port, an output pin TX0 of the second logical communication port 111 is configured to be grounded, an output pin TX of a third logical communication port 112 is configured to be a SPI signal transmitting port, and an input pin RXO of the third logical communication port 112 is configured to be grounded. This design implements HBS simultaneous transmission and reception, avoiding a problem of frequent interrupts of simulation superimposition of a timer, and without concerns about a problem of difficulty in alignment between edges of signal transmitting data and a signal transmitting clock. In addition, a transmitting signal is based on data simulation, so that a problem is resolved that the start bit, the stop bit, and the check bit for the SPI signal are different from those of a common UART signal.

For example, in some embodiments of this disclosure, a receive port of a UART of the control chip may be used to receive a signal, the receive port is configured to independently receive the signal, and a transmit port of the UART may still be used to implement another function; a transmit port of the SPI of the control chip may be used to transmit a signal, the transmit port is configured to independently transmit the signal, and a receive port of the SPI may still be used to implement another function.

An embodiment of this disclosure further provides a home bus system (HBS) circuit, applicable to home bus (HB) communication implemented using a Microchip chip. Referring to FIG. 11, the circuit includes: the Microchip chip 11, an HBS communication chip 12, a resistor R, a capacitor C1, and a transistor Q1. For connection relationships among the elements, refer to the foregoing description. Details are not described again.

The Microchip chip 11 may receive a UART signal by using a UART input pin. The Microchip chip 11 is configured to generate a SPI signal based on translation from a UART signal. Every four bytes in the SPI signal are corresponding to a frame for the UART signal, a Baud rate of the SPI signal is twice a Baud rate of the UART signal, and the SPI signal is in compliance with a Home Bus System (HBS) protocol. The Microchip chip 11 transmits the SPI signal through the SPI output pin. The HBS communication chip 12 is configured to receive the SPI signal and output differential simulation signals.

In some embodiments of this disclosure, the Microchip chip 11 is configured to generate the SPI signal based on translation from the UART signal in a manner of: correspondingly translating a bit value "0" of a bit for the UART signal into bit values "0,1" of two bits for the SPI signal; and correspondingly translating a bit value "1" of a bit for the UART signal into bit values "1,1" of two bits for the SPI signal.

In some embodiments, "in compliance with the HBS protocol" means that there is a transition from "0" to "1" or vice verse, and the HBS communication chip may trigger a pulse of a differential signal based on the transition between "0" and "1".

In some embodiments of this disclosure, the Microchip chip does not have a synchronization clock I/O port or a circuit for simulating an external synchronization clock. In other words, the Microchip chip 11 performs data translation without referring to a synchronization clock signal.

Figure 14:
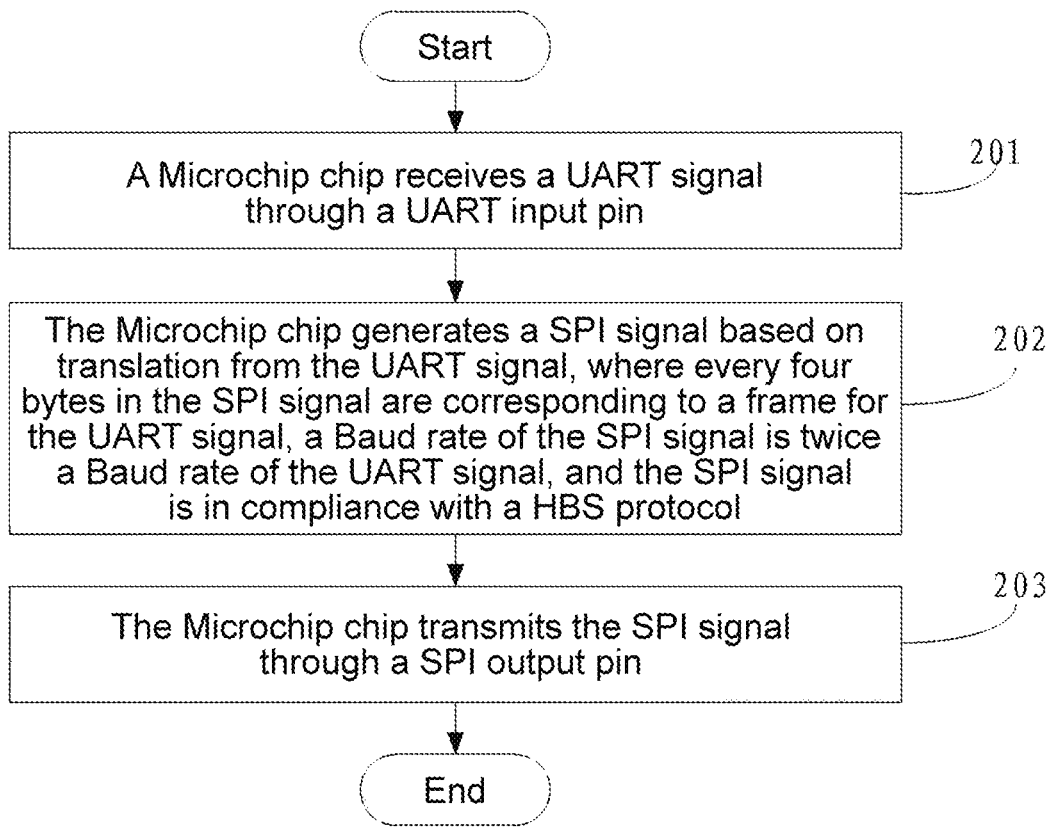
FIG. 14 is a schematic flowchart of another translation-based signal generation method in accordance with an embodiment of this disclosure.

An embodiment of this disclosure further provides a translation-based signal generation method, applicable to the circuit shown in FIG. 11. Referring to FIG. 14, the method includes steps:

201. The Microchip chip receives a UART signal through the UART input pin, where the UART signal is not modulated by a synchronization clock.

202. The Microchip chip generates a SPI signal based on translation from the UART signal, where every four bytes in the SPI signal are corresponding to a frame for the UART signal, a Baud rate of the SPI signal is twice a Baud rate of the UART signal, and the SPI signal is in compliance with a home bus system HBS protocol.

203. The Microchip chip transmits the SPI signal through the SPI output pin, where the SPI signal is used as input to the HBS communication chip so as to acquire differential simulation HB signals.

In the translation-based signal generation method provided in this embodiment of this application, the Microchip chip generates the SPI signal based on translation from the input UART signal by bytes, so that the SPI signal is in compliance with the home bus system HBS protocol. The SPI signal is used as the input to the HBS communication chip, and finally, the HBS communication chip outputs the differential simulation HB signals, to implement home bus (Home Bus) communication.

Figure 15:
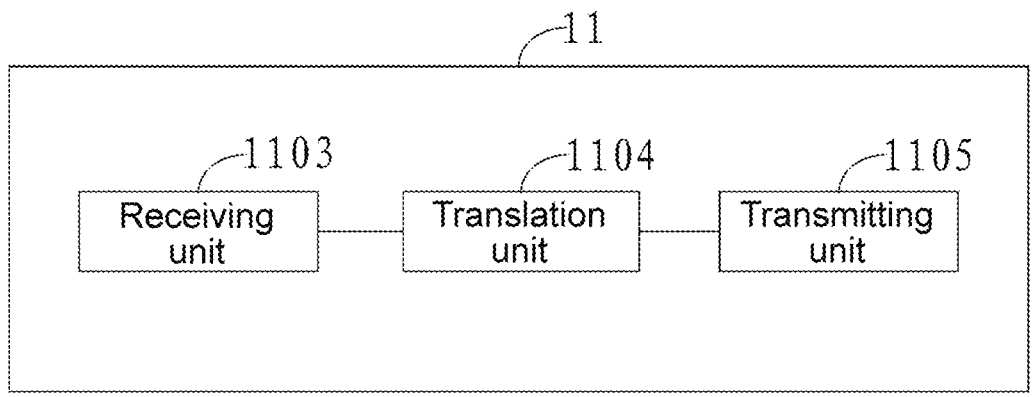
FIG. 15 is a schematic structural diagram illustrating another translation-based signal generation device in accordance with some embodiments of this disclosure.

An embodiment of this application provides a translation-based signal generation device, applicable to the foregoing method, and configured to implement home bus HB communication through a Microchip chip. Referring to FIG. 15, the device includes:

a receiving unit 1103, configured to receive a UART signal through a UART input pin, where the UART signal is not modulated by a synchronization clock;

a translation unit 1104, configured to generate a SPI signal based on translation from the UART signal received by the receiving unit 1103, where every four bytes in the SPI signal are corresponding to a frame for the UART signal, a Baud rate of the SPI signal is twice a Baud rate of the UART signal, and the SPI signal is in compliance with a home bus system HBS protocol; and a transmitting unit 1105, configured to transmit, through a SPI output pin, the SPI signal generated by the translation unit 1104 through translation, where the SPI signal is used as input to an HBS communication chip to acquire a differential simulation HB signal.

Some embodiments of this disclosure further provide a Home Bus System (HBS) circuit, including any translation-based signal generation device described above. In the HBS circuit provided in this embodiment of this disclosure, a control chip without synchronization clock signal output, for example, a Microchip chip may be used.

Some embodiments of this disclosure further provide a user equipment, including a home bus system HBS circuit or any translation-based signal generation device described above. The user equipment may be a smart household product such as an air conditioner, a refrigerator, a washing machine, a television, a kitchen appliance, or the like. For example, the user equipment may be a multi-split air conditioner product. The user equipment may alternatively be an electronic device such as a mobile phone or a gaming device or any device that may access an HBS communication network or a similar communication network. The similar communication network herein refers to a communication network in which communication requires a synchronization clock signal.

An embodiment of this disclosure provides a controller. The controller includes: a memory, configured to store a computer program and data of a communication signal of intention transmission; and a processor, configured to execute the computer program to implement the method including steps:

101. Acquire a communication signal of intention transmission.

102. Generate a synchronous simulation signal by a control chip, where the synchronous simulation signal is in compliance with a home bus system HBS protocol.

103. Convert the synchronous simulation signal into a differential simulation signal.

An embodiment of this disclosure provides a computer storage medium. The computer storage medium is configured to store a computer program, and the computer program is executed to implement the following method:

101. Acquire a communication signal of intention transmission.

102. Generate a synchronous simulation signal by a control chip based on translation from the communication signal, where the synchronous simulation signal is in compliance with a home bus system HBS protocol.

103. Convert the synchronous simulation signal into a differential simulation signal.

An embodiment of this disclosure provides a computer program product. The computer program product includes an instruction, and the instruction is run on a computer to implement the following method including steps:

101. Acquire a communication signal of intention transmission.

102. Generate a synchronous simulation signal by a control chip, where the synchronous simulation signal is in compliance with a home bus system HBS protocol.

103. Convert the synchronous simulation signal into a differential simulation signal.

The device in this embodiment of this disclosure may be applicable to the foregoing method. Therefore, for technical effects the device can achieve, refer to the foregoing method embodiment, and details are not described herein again in this embodiment of this disclosure.

It may be clearly understood by persons skilled in the art that, for the purpose of convenient and brief description, for a specific working process of the foregoing system, device, equipment, and unit, refer to a corresponding process in the foregoing method embodiment, and details are not described herein again.

The acquirement module and the simulation module may be separately disposed, or may be integrated into a processor of the controller, or may be implemented by program which is stored in the memory of the controller and is invoked by a processor of the controller to perform functions of the modules. The processor herein may be a central processing unit (Central Processing Unit, CPU) or an application-specific integrated circuit (Application-Specific Integrated Circuit, ASIC), or may be configured as one or more integrated circuits for implementing the embodiments of this disclosure.

In the embodiments of this disclosure, sequence numbers of the steps do not mean particular execution sequences. The execution sequences of the steps should be determined based on functions and internal logic of the steps, and should not be construed as any limitation on the implementation processes of the embodiments of this disclosure.

Persons of ordinary skill in the art may be aware that, with reference to function modules and algorithm steps in the examples described in the embodiments disclosed in this specification, this disclosure may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, without departing from the spirit and scope of this disclosure.

In the several embodiments provided in this disclosure, it should be understood that the disclosed system, device, equipment, and method may be implemented in other manners. For example, the described device embodiment is merely an example. For example, the function module division is merely logical function division and may be implemented by other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the devices or function modules may be implemented in electronic, mechanical, or other forms.

The function modules, units, or components described as separate parts may or may not be physically separate, and parts displayed as components may or may not be physical units, may be located in one position, or may be distributed on a plurality of network units. Some or all of the units may be selected based on actual needs to achieve the objectives of the solutions of the embodiments.

In addition, function modules or elements in the embodiments of this disclosure may be integrated into one unit, or each of the units may exist alone physically, or two or more units are integrated into one unit.

The steps of the method or algorithm described in the embodiments of this disclosure may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other form well known in the art. An example storage medium is coupled to the processor, so that the processor can read information from the storage medium, and can write information into the storage medium. The processor may be a device having a logical operation capability and/or a program execution capability, such as a central processing unit (CPU), a field programmable logic array (FPGA), a micro control unit (MCU), or an application-specific integrated circuit (ASIC).

When implemented by a software program, the embodiments may be all or some implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programming device. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (such as a coaxial cable, an optical fiber, or a digital subscriber line (Digital Subscriber Line, DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium, a semiconductor medium, or the like.

In the embodiments of this disclosure, data, information, and the like may be communicated through a network connection directly or indirectly. For example, the network may include a wireless network, a wired network, and/or any combination thereof. The network may include a local area network, the Internet, a telecommunications network, an Internet of things based on the Internet and/or the telecommunications network, and/or any combination thereof. In the wired network, such as a twisted pair, a coaxial cable, an optical fiber, or other transmission means may be used for communication. In the wireless network, such as a 3G/4G/5G mobile communications network, Bluetooth, Zigbee, WiFi, or other transmission means may be used.

In the description of the above embodiments, specific features, structures, materials, or characteristics may be combined in a suitable manner in any one or more embodiments or examples.

The foregoing descriptions are merely specific implementations of this application, and are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A home bus system (HBS) circuit, applicable to home bus (HB) communication implemented through a first chip without a synchronization clock I/O port, wherein the circuit comprises:
    the first chip having a serial peripheral interface (SPI) output pin, and
    a second chip as an HBS communication chip having an input pin,
    wherein the SPI output pin is coupled to the input pin of the HBS communication chip.

2. The HBS circuit according to claim 1, wherein the first chip has a universal asynchronous receiver/transmitter (UART) input pin.

3. The HBS circuit according to claim 1, further comprising a level converter comprising a transistor, a resistor, and a capacitor,
    wherein the transistor has a base coupled to the SPI output pin and a first end of the capacitor, a collector coupled to a first end of the resistor and the input pin of the HBS communication chip, and an emitter grounded, wherein a second end of the resistor is coupled to a power supply, and a second end of the capacitor is grounded.

4. The HBS circuit according to claim 1, wherein the first chip is configured to transmit a SPI signal, for simulating a UART signal modulated by a synchronization clock signal, through the SPI output pin.

5. The HBS circuit according to claim 4, wherein every four bytes in the SPI signal are corresponding to a frame for the UART signal, the SPI signal having a Baud rate twice the UART signal.

6. The HBS circuit according to claim 4, wherein a frame for the UART signal comprises a start bit, data bits, a check bit, and a stop bit, and the data bits comprise eight bits D0, D1, D2, D3, D4, D5, D6, and D7; and
    wherein the modulated UART signal is simulated by the SPI signal so that the start bit is corresponding to last two bits in a first byte for the SPI signal, the data bits D0, D1, D2, and D3 are corresponding to a second byte for the SPI signal, the data bits D4, D5, D6, and D7 are corresponding to a third byte for the SPI signal, and the check bit and the stop bit are corresponding to first four bits in a fourth byte for the SPI signal.

7. The HBS circuit according to claim 6, wherein the modulated UART signal is simulated by the SPI signal so as to assign 0 to first six bits in the first byte for the SPI signal, and assign 0 to last four bits in the fourth byte for the SPI signal.

8. The HBS circuit according to claim 4, wherein a frame for the UART signal comprises a start bit, data bits, a check bit, and a stop bit, and the data bits comprise eight bits D0, D1, D2, D3, D4, D5, D6, and D7; and
    wherein the modulated UART signal is simulated by the SPI signal so that the start bit and the date bits D0, D1, and D2 are corresponding to a first byte for the SPI signal, the data bits D3, D4, D5, and D6 are corresponding to a second byte for the SPI signal, and the data bit D7, the check bit, and the stop bit are corresponding to first six bits in a third byte for the SPI signal.

9. A user equipment, comprising a home bus system (HBS) circuit, applicable to home bus (HB) communication implemented through a control chip without a synchronization clock I/O port, wherein the circuit comprises:
   the control chip, configured to generate and transmit a synchronous simulation signal in compliance with a home bus system (HBS) protocol, the synchronous simulation signal being for simulating a communication signal modulated by a synchronization clock signal; and
   an HBS communicator, configured to receive and convert the synchronous simulation signal from the control chip into a differential simulation signal for HBS communication.

10. The user equipment according to claim 9, wherein the control chip comprises:
    a processor, configured to generate the synchronous simulation signal according to the communication signal by looking up a preset modulation translation table; and
    a memory, configured to store the modulation translation table, wherein the modulation translation table includes a correspondence between the communication signal and the synchronous simulation signal.

11. The user equipment according to claim 10, wherein the processor comprises:
    an acquirement module, configured to read values of bit groups for a message frame for the communication signal by a preset grouping scheme, wherein each of the values of the bit groups for the message frame comprises values of one or more bits for the message frame; and
    a simulation module, configured to translate the read values of the bit groups into a byte for the synchronous simulation signal by looking up the modulation translation table, wherein the modulation translation table comprises a plurality of translation subtables each including mappings from all possible values of a bit group to a corresponding byte for the synchronous simulation signal.

12. The user equipment according to claim 9, wherein the communication signal is a universal asynchronous receiver/transmitter (UART) signal in compliance with a UART communication protocol, and the synchronous simulation signal is a serial peripheral interface (SPI) signal in compliance with a SPI communication protocol; and the control chip is configured to generate the SPI signal based on translation from the UART signal in a manner of:
    correspondingly translating a bit value "0" of a bit for the UART signal into bit values "01" of two bits for the SPI signal; and
    correspondingly translating a bit value "1" of a bit for the UART signal into bit values "11" of two bits for the SPI signal.

13. The user equipment according to claim 9, wherein the control chip comprises a serial peripheral interface, and configured to output the synchronous simulation signal through an output pin of the serial peripheral interface; and
    the HBS communicator comprises an input pin, and configured to receive the synchronous simulation signal through the input pin.

14. The user equipment according to claim 13, further comprising a level converter, wherein
    the output pin of the serial peripheral interface is coupled to the input pin of the HBS communicator through the level converter; and
    the level converter is configured to perform level inversion on the synchronous simulation signal output from the output pin of the serial peripheral interface, to meet a requirement of the input pin of the HBS communicator.

15. The user equipment according to claim 14, wherein the level converter comprises: a transistor, a resistor, and a capacitor, wherein
    the transistor has a base coupled to the output pin of the serial peripheral interface and a first end of the capacitor, an emitter grounded, a collector coupled to a first end of the resistor and the input pin of the HBS communicator, wherein a second end of the resistor is coupled to a power supply, and a second end of the capacitor is grounded.

16. The user equipment according to claim 15, wherein the control chip is suitable for communicating through synchronous transmission and asynchronous reception; and
    the control chip has a first logical communication port configured to have an input pin as a UART signal receiving port, and have an output pin as a SPI signal transmitting port; or
    the control chip has a second logical communication port configured to have an input pin as a UART signal receiving port, and have an output pin grounded, and has a third logical communication port configured to have an output pin as a SPI signal transmitting port, and have an input pin grounded.

17. A signal generation method, implementing home bus (HB) communication through a chip without a synchronization clock I/O port, comprising:
    acquiring a communication signal;
    generating and transmitting a synchronous simulation signal in compliance with a home bus system (HBS) protocol, the synchronous simulation signal being for simulating the communication signal modulated by a synchronization clock signal; and
    converting the synchronous simulation signal into a differential simulation signal.

18. The method according to claim 17, wherein the synchronous simulation signal is generated regardless of a synchronization clock signal.

* * * * *